(12) United States Patent
Kirk, II et al.

(10) Patent No.: US 8,859,101 B2
(45) Date of Patent: Oct. 14, 2014

(54) MULTI-LAYER ARTICLE

(75) Inventors: Peter A. Kirk, II, Manchester, NH (US); Ruth A. Jamke, Bedford, NH (US); Robert G. Pleydon, Worcester, MA (US); Jiri George Drobny, Merrimack, NH (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 707 days.

(21) Appl. No.: 12/363,549

(22) Filed: Jan. 30, 2009

(65) Prior Publication Data

US 2009/0197091 A1 Aug. 6, 2009

Related U.S. Application Data

(60) Provisional application No. 61/026,381, filed on Feb. 5, 2008.

(51) Int. Cl.
| | | |
|---|---|---|
| *B29C 71/02* | (2006.01) | |
| *B32B 27/08* | (2006.01) | |
| *B32B 7/12* | (2006.01) | |
| *A62B 17/00* | (2006.01) | |
| *C09J 127/06* | (2006.01) | |
| *C09J 175/04* | (2006.01) | |
| *A41D 27/24* | (2006.01) | |
| *A62D 5/00* | (2006.01) | |
| *C09J 127/16* | (2006.01) | |
| *A41D 31/00* | (2006.01) | |

(52) U.S. Cl.
CPC . *B32B 27/08* (2013.01); *B32B 7/12* (2013.01); *A62B 17/006* (2013.01); *C08G 2170/20* (2013.01); *C09J 127/06* (2013.01); *C09J 175/04* (2013.01); *A41D 27/245* (2013.01); *A62D 5/00* (2013.01); *C09J 127/16* (2013.01); *A41D 31/0083* (2013.01)

USPC ............ 428/421; 428/58; 428/422; 428/500; 428/543; 428/704; 156/157; 156/272.6; 156/308.4; 156/309.9

(58) Field of Classification Search
USPC ................... 428/58, 421, 422, 500, 543, 704; 156/157, 272.6, 308.4, 309.9
See application file for complete search history.

(56) References Cited

U.S. PATENT DOCUMENTS 2,906,658 A 9/1959 Doban
3,030,290 A * 4/1962 Ryan, Jr. ........................ 204/169

(Continued)

FOREIGN PATENT DOCUMENTS

CN 1261306 A 7/2000
EP 0278685 A2 8/1988

(Continued)

OTHER PUBLICATIONS

Colloidal Silica, Fundamentals and Applications; eds. Haracio E. Bergna and William O. Roberts; CRC Press, Boca Raton, FL, 2006; pp. 163-164.*

(Continued)

*Primary Examiner* — Richard A Huhn
(74) *Attorney, Agent, or Firm* — Abel Law Group, LLP; Chi S. Kim

(57) ABSTRACT

The disclosure is directed to an article including a first layer, second layer, and third layer. The first layer includes a fluoropolymer having a first major surface and a second major surface. The second layer overlies the first major surface of the first layer and includes an adhesive layer. The third layer overlies the second layer and includes a polymeric material. The article has a burst performance greater than 200 N as measured by ASTM D751 and a chemical permeation breakthrough detection time greater than about one hour as measured by ASTM F739. The disclosure is further directed to a method of forming the aforementioned multi-layer article.

26 Claims, 1 Drawing Sheet

100

(56) References Cited

U.S. PATENT DOCUMENTS

| | | | |
|---|---|---|---|
| 3,586,821 A | 6/1971 | Buob | |
| 3,676,181 A | 7/1972 | Kowalewski | |
| 4,317,860 A | 3/1982 | Strassel | |
| 4,317,861 A | 3/1982 | Kidoh et al. | |
| 4,444,861 A | 4/1984 | Nogami et al. | |
| 4,549,921 A | 10/1985 | Wolfe, Jr. | |
| 4,640,865 A | 2/1987 | Lancaster et al. | |
| 4,714,512 A | 12/1987 | House et al. | |
| 4,883,716 A | 11/1989 | Effenberger et al. | |
| 4,943,473 A | 7/1990 | Sahatjian et al. | |
| 4,946,736 A | 8/1990 | Sassa | |
| 5,075,065 A | 12/1991 | Effenberger et al. | |
| 5,112,692 A | 5/1992 | Strassel et al. | |
| 5,322,899 A | 6/1994 | Grunewalder et al. | |
| 5,427,831 A * | 6/1995 | Stevens | 428/36.2 |
| 5,529,830 A | 6/1996 | Dutta et al. | |
| 5,908,704 A | 6/1999 | Friedman et al. | |
| 6,183,861 B1 | 2/2001 | Carroll | |
| 6,306,503 B1 | 10/2001 | Tsai | |
| 6,726,976 B2 | 4/2004 | Dimitri | |
| 6,726,979 B2 * | 4/2004 | Friedman et al. | 428/141 |
| 6,759,129 B2 | 7/2004 | Fukushi | |
| 6,930,063 B2 | 8/2005 | Keese | |
| 7,141,303 B2 | 11/2006 | Clemens et al. | |
| 7,270,870 B2 | 9/2007 | Hetzler et al. | |
| 2002/0179240 A1 | 12/2002 | Clemens et al. | |
| 2003/0207118 A1 | 11/2003 | Fukushi et al. | |
| 2003/0232571 A1 * | 12/2003 | Weinerth | 450/41 |
| 2004/0144482 A1 | 7/2004 | Cherpinsky et al. | |
| 2004/0166270 A1 | 8/2004 | Yoshida et al. | |
| 2004/0229043 A1 | 11/2004 | Spohn et al. | |
| 2005/0077202 A1 | 4/2005 | Blum et al. | |
| 2005/0186372 A1 | 8/2005 | Shah et al. | |
| 2005/0255771 A1 | 11/2005 | Chetty et al. | |
| 2005/0271867 A1 | 12/2005 | Hetzler et al. | |
| 2007/0044906 A1 * | 3/2007 | Park | 156/272.2 |
| 2010/0119760 A1 | 5/2010 | Kirk, II et al. | |
| 2010/0266852 A1 | 10/2010 | Fan et al. | |

FOREIGN PATENT DOCUMENTS

| | | | |
|---|---|---|---|
| EP | 0320258 A1 | 6/1989 | |
| EP | 0976544 A1 | 4/1998 | |
| JP | 59-140052 A | 8/1984 | |
| JP | 62-023751 A | 1/1987 | |
| JP | 02-196643 A | 10/1989 | |
| JP | H05-261856 A | 10/1993 | |
| JP | 07001683 | 1/1995 | |
| JP | 07228848 A | 8/1995 | |
| JP | 07299890 | 11/1995 | |
| JP | 08-181522 A | 7/1996 | |
| JP | 09-508079 A | 8/1997 | |
| JP | 09239923 | 9/1997 | |
| JP | 2002202675 A | 7/2002 | |
| JP | 2006-144875 A | 6/2006 | |
| JP | 2007096575 A | 4/2007 | |
| JP | 2007-145025 A | 6/2007 | |
| JP | 2008-501552 A | 1/2008 | |
| KR | 20070011586 A | 1/2007 | |
| WO | 92/08609 A2 | 5/1992 | |
| WO | 9519883 A | 7/1995 | |
| WO | 03037443 A1 | 8/2003 | |
| WO | 2005002849 A2 | 1/2005 | |
| WO | 2008/005744 A2 | 1/2008 | |
| WO | 2009099965 A | 8/2009 | |
| WO | 2010056377 A | 5/2010 | |

OTHER PUBLICATIONS

Friedman, M. and Walsh, G., "High Performance Films: Review of New Materials and Trends", Polymer Engineering and Science 2002, 42(8), 1756-1788.*
Initial IP Search, 3 pages, Nov. 21, 2007.
Technical Information Services Search Results, 25 pages, Apr. 20, 2009.
International Search Report from Related Case, PCT/US2009/032669, Sep. 9, 2009, 8 pages.
Related to U.S. Appl. 12/363,490, filed Jan. 30, 2009.
"Standard Test Method for Permeation of Liquids and Gases through Protective Clothing Materials under Conditions of Continuous Contact", ASTM F739-07, Jan. 1, 2007, pp. 169-180, XP009165094.
"Shelter-Rite High Performance 8028 Architectural Fabric", Seaman Corporation, 2001, XP002688118, Retrieved from the Internet: URL:http://architecturalfabrics.com/downloads/product-data/8028_fabric_test_results.pdf [retrieved on Nov. 28, 2012].
Alphonsus V. Pocius, "Adhesion and Adhesives Technology: An Introduction". pp. 153, Chemical Industry Press, Jan. 31, 2005. English Translation Attached.
International Search Report from Related Case, PCT/US2009/032711, Sep. 9, 2009, 8 pages.

* cited by examiner

100

200

300

MULTI-LAYER ARTICLE

CROSS-REFERENCE TO RELATED APPLICATIONS

The present application claims priority from U.S. Provisional Patent Application No. 61/026,381, filed Feb. 5, 2008, entitled "MULTI-LAYER ARTICLE," naming inventors Peter A. Kirk, II., Ruth A. Jamke, Robert G. Pleydon, and George Drobny, which application is incorporated by reference herein in its entirety.

FIELD OF THE DISCLOSURE

This disclosure, in general, relates to multi-layer articles and methods for making such articles.

BACKGROUND

Low surface energy polymers, such as fluoropolymers, exhibit good chemical barrier properties, exhibit a resistance to damage caused by exposure to chemicals, have a resistance to stains, demonstrate a resistance to damage caused by exposure to environmental conditions, and typically, form a release surface. While such low surface energy polymers are in demand, the polymers tend to be expensive. In addition, such polymers exhibit low wetting characteristics and given their tendency to form a release surface, adhere poorly with other polymer substrates.

For particular multilayer article applications, manufacturers have turned to high temperature processing and high temperature seaming. For instance, temperatures in excess of 350° F. are typically used. Unfortunately, these high temperatures often exceed the melting temperature of many desirable substrates. Accordingly, fluoropolymers have typically been commercially adhered to high melt temperature substrates. These multilayer articles are typically expensive since they are limited to high melt temperature substrates. Commercially, there has been considerable difficulty with fluoropolymer adhesion to low melt temperature substrates, which are often more cost effective.

Hence, it would be desirable to provide both an improved multilayer article as well as a method for manufacturing such a multilayer article.

SUMMARY

In an embodiment, an article is provided. The article includes a first layer, where the first layer includes a fluoropolymer having a first major surface and a second major surface. A second layer overlies the first major surface of the first layer and includes an adhesive layer. A third layer overlies the second layer and includes a polymeric material. The article has a burst performance greater than about 200 N as measured by ASTM D751 and a chemical permeation breakthrough detection time greater than about one hour as measured by ASTM F739.

In another exemplary embodiment, an article is provided. The article includes a first layer, where the first layer includes a fluoropolymer having a first major surface and a second major surface. A second layer overlies the first major surface of the first layer and includes an adhesive layer. A third layer overlies the second layer and includes a polymeric material. The article has a tensile strength greater than about 3.0 kN/m as measured in accordance with ASTM D751 and a chemical permeation breakthrough detection time greater than about one hour as measured by ASTM F739.

In a further exemplary embodiment, an article is provided. The article includes a first layer, wherein the first layer includes a fluoropolymer having a first major surface and a second major surface. A second layer overlies the first major surface of the first layer and includes a thermoplastic adhesive layer. The thermoplastic adhesive layer has a melt temperature not greater than about 300° F. A third layer overlies the second layer and includes a polymeric layer.

In an embodiment, a method of forming a multi-layer article is provided. The method includes providing a first layer, a second layer, and a third layer. The first layer includes a fluoropolymer having a first major surface and a second major surface. The second layer overlies the first major surface of the first layer and includes an adhesive layer. The third layer directly contacts the second layer and includes a thermoplastic layer. The method further includes heating the multi-layer article to a temperature not greater than about 350° F.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

Figure 1:
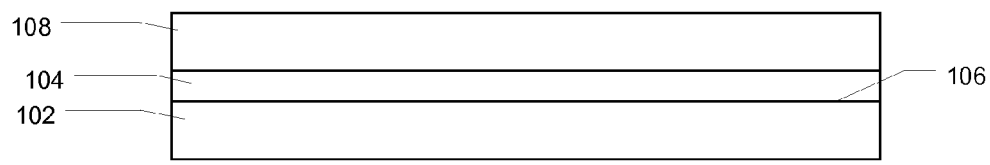
FIGS. 1, 2 and 3 include illustrations of exemplary multi-layer articles.

In a particular embodiment, an article includes a first layer having a first major surface and a second major surface. The first layer includes a fluoropolymer. The article further includes a second layer overlying the first major surface. The second layer is an adhesive layer. Further, the article includes a third layer overlying the second layer. In an embodiment, the third layer of the article is a polymeric layer.

An exemplary fluoropolymer used in the first layer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE). Exemplary fluoropolymers films may be cast, skived, or extruded.

Further, exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include a copolymer of tetrafluoroethylene and perfluoropropyl vinyl ether (PFA). In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers may be obtained from Daikin (Japan) and DuPont (USA). In particular, FEP fluoropolymers are commercially available from Daikin, such as NP-12X.

In an embodiment, at least one surface of the fluoropolymer may include a C-treatable fluoropolymer. Exemplary C-treatable fluoropolymers include fluorinated ethylene propylene copolymer (FEP), a copolymer of ethylene and tetrafluoroethylene (ETFE), a copolymer of tetrafluoroethylene and perfluoropropyl vinyl ether (PFA), a copolymer of ethylene and chlorotrifluoroethylene (ECTFE), a copolymer of tetrafluoroethylene and perfluoromethyl vinyl ether (MFA), poly vinylidene fluoride (PVDF), and a terpolymer including tetrafluoroethylene, hexafluoropropylene, and vinylidenefluoride (THV). In an embodiment, the fluoropolymer has a first major surface of the fluoropolymer and a second major surface of the fluoropolymer where the first and second major surface includes the same or different C-treatable fluoropolymers. In an embodiment, at least one surface of the fluoropolymer may include a copolymer of tetrafluoroethylene and perfluoropropyl vinyl ether (PFA) or fluorinated ethylene propylene copolymer (FEP). In an embodiment, the fluoropolymer is a PTFE core having a copolymer of tetrafluoroethylene and perfluoropropyl vinyl ether (PFA) on the first surface and fluorinated ethylene propylene copolymer (FEP) on the second surface. An exemplary PTFE may be obtained from Saint Gobain, such as DB1700.

In an embodiment, the fluoropolymer layer may be treated to improve adhesion between the adhesive layer and the fluoropolymer layer. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof. In an embodiment, the treatment includes C-treatment. For C-treatment, the fluoropolymer layer is exposed to a corona discharge in an organic gas atmosphere, wherein the organic gas atmosphere comprises acteone or an alcohol of four carbon atoms or less. In an embodiment, the organic gas is acetone. In an embodiment, the organic gas is admixed with an inert gas such as nitrogen. The acetone/nitrogen atmosphere causes an increase of adhesion of the fluoropolymer layer to the adhesive layer. In an exemplary embodiment, the treatment includes C-treatment of a C-treatable fluoropolymer. An example of the C-treatment is disclosed in U.S. Pat. No. 6,726,979.

In another exemplary embodiment, at least one major surface of the fluoropolymer layer includes colloidal silica. The colloidal silica typically is present in a solution at an amount to provide adhesion between the first layer and the second layer. In an embodiment, the colloidal silica is present in a solution that does not adversely impact the adhesive properties of the colloidal silica. An exemplary colloidal silica dispersion is described in U.S. Pat. No. 6,930,063, hereby incorporated by reference.

The article further includes an adhesive layer. In an exemplary embodiment, the adhesive layer includes a thermoplastic material. For instance, the thermoplastic material may include thermoplastic elastomers, such as cross-linkable elastomeric polymers of natural or synthetic origin. For example, an exemplary elastomeric material may include silicone, natural rubber, urethane, olefinic elastomer, diene elastomer, blend of olefinic and diene elastomer, fluoroelastomer, perfluoroelastomer, or any combination thereof. In a particular embodiment, the adhesive layer includes polyurethane. Commercially available thermoplastic adhesive materials include polyurethanes 3206D and 3410 available from Bemis Associates. In a further embodiment, the adhesive layer includes a thermoplastic material having a melt temperature not greater than about 300° F. In an embodiment, the adhesive layer includes a thermoplastic material having a melt temperature not greater than about 350° F., such as not greater than about 400° F., such as not greater than about 450° F. In an embodiment, the adhesive layer includes a thermoplastic material having a melt temperature greater than about 500° F.

In another embodiment, the adhesive layer includes poly vinylidene fluoride-polyvinyl chloride (PVDF-PVC). In an embodiment, the PVDF and PVC of the adhesive layer are present at a ratio of greater than about 50/50 by weight, such as greater than about 60/40 by weight, such as about 75/25 to about 90/10 by weight, or even 75/25 to about 85/15 by weight.

Typically, the adhesive layer has a thickness of at least about 0.1 mil, such as at least about 0.5 mil. For example, the thickness of the adhesive layer 104 may be in a range of about 0.1 mil to about 4.0 mil, such as about 0.1 mil to about 2.0 mil.

In an embodiment, the third layer includes polymeric materials such as thermoplastics and thermosets. An exemplary polymeric material may include polyamide, polyaramide, polyimide, polyolefin, polyvinylchloride (PVC), acrylic polymer, diene monomer polymer, polycarbonate (PC), polyetheretherketone (PEEK), fluoropolymer, polyester, polypropylene, polystyrene, polyurethane, thermoplastic blends, or any combination thereof. Further polymeric materials may include silicones, phenolics, epoxys, glass-filled nylon, or any combination thereof. In an embodiment, the third layer includes polyvinylchloride. In an embodiment, the third layer includes polyurethane. In an embodiment, the third layer includes a polymeric material that has similar properties to PVC or polyurethane, including, for example, mechanical properties, flammability properties, bondable properties, and the like. The fluoropolymer composition, adhesive layer, and the polymeric layer can be used to form any useful article. To form a useful article, the polymeric layer may be processed. Processing of the polymeric substrate, particularly the thermoplastic substrates, may include casting, extruding or skiving. In an embodiment, the polymeric layer may be embossed, textured or otherwise surface treated in order to create desirable surface properties, such as a low friction surface.

Typically, the third layer has a thickness of at least about 0.1 millimeters. For example, the third layer may have a thickness of about 0.2 millimeters to about 2.0 millimeters, such as about 0.2 millimeters to about 1.5 millimeters, such as about 0.2 millimeters to about 1.0 millimeters.

In an embodiment, a reinforcing layer may also be used. In an embodiment, the reinforcing layer overlies at least one major surface of the adhesive layer and at least one major surface of the third layer. In an embodiment, the reinforcing layer directly contacts a major surface of the adhesive layer and a major surface of the third layer. In another embodiment, the reinforcing layer may overlie the third layer. In an embodiment, the reinforcing layer may be substantially embedded in the third layer. In an embodiment, the reinforcing layer can be substantially embedded in the adhesive layer. "Substantially embedded" as used herein refers to a reinforcing layer wherein at least 25%, such as at least about 50%, or even 75% of the total surface area of the reinforcing layer is directly in contact with the third layer or adhesive layer, as described above. In a further embodiment, the reinforcing layer may be the third layer. The reinforcing layer can be any material that increases the reinforcing properties of the multilayer article. For instance, the reinforcing layer may include natural fibers, synthetic fibers, or combination thereof. In an embodiment, the fibers may be in the form of a knit, laid scrim, braid, woven, or non-woven fabric. Exemplary reinforcement fibers include glass, aramids, polyamides, polyesters, and the like. The reinforcing layer may have a thickness of less than about 5.0 mm, such as not greater than about 2.0 mm.

An exemplary embodiment of an article 100 is illustrated in FIG. 1. The article includes first layer 102 and the second layer 104 overlying a major surface 106 of the first layer 102. In an embodiment, the first layer 102 directly contacts the second layer 104. The first layer 102 is a fluoropolymer and the second layer 104 is an adhesive layer. Further, overlying the second layer 104 is a third layer 108. As seen in FIG. 1, the third layer 108 directly contacts the second layer 104. The third layer 108 is a polymeric layer.

Figure 2:
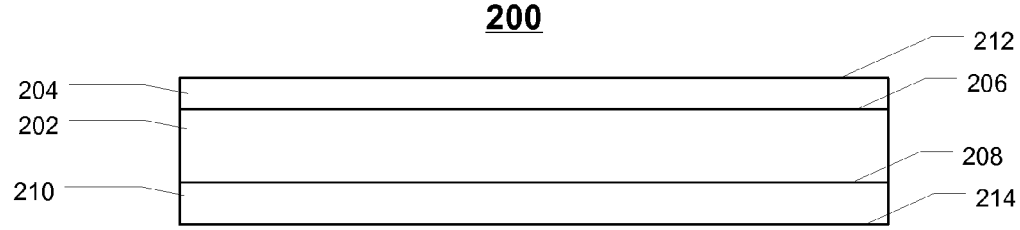

Another exemplary article is illustrated in FIG. 2 and is generally designated 200. The article includes first layer 202 and the second layer 204 overlying a first major surface 206 of the first layer 202. In an embodiment, the first layer 202 directly contacts the second layer 204. The first layer 202 is a fluoropolymer and the second layer 204 is an adhesive layer. Further, overlying the second major surface 208 of the first layer 202 is a third layer 210. As seen in FIG. 2, the third layer 210 directly contacts the first layer 202. In an embodiment, the third layer 210 is a second adhesive layer. The first adhesive layer 204 and the second adhesive layer 210 may be the same or different material. In a further embodiment, a first polymeric layer (not shown) may contact a major surface 212 of the adhesive layer 204. In another further embodiment, a second polymeric layer (not shown) may contact a major surface 214 of the adhesive layer 210. The first polymeric layer and the second polymeric layer may be the same or different material.

Figure 3:
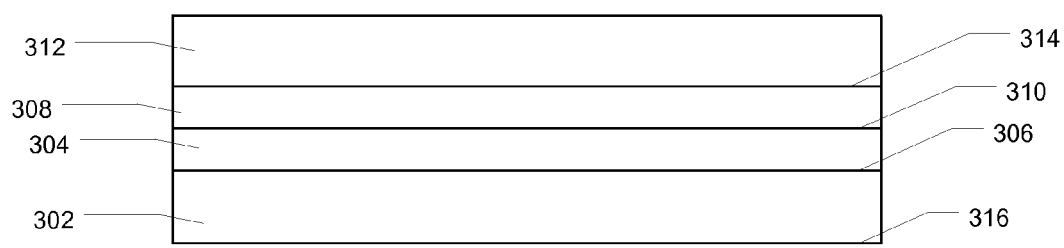

Another exemplary article is illustrated in FIG. 3 and is generally designated 300. The article includes first layer 302 and the second layer 304 overlying a major surface 306 of the first layer 302. In an embodiment, the first layer 302 directly contacts the second layer 304. The first layer 302 is a fluoropolymer and the second layer 304 is an adhesive layer. As seen in FIG. 3, a reinforcing layer 308 directly contacts a major surface 310 of the adhesive layer 304. A polymeric layer 312 directly contacts a major surface 314 of the reinforcing layer 308. In a further embodiment, a second adhesive layer (not shown) may contact a second major surface 316 of the first layer 302. The first adhesive layer and the second adhesive layer may be the same or different material. In a further embodiment, the article may include a second polymeric layer (not shown) in contact with the second adhesive layer. The first polymeric layer and the second polymeric layer may be the same or different material. In another further embodiment, a second reinforcing layer (not shown) may be sandwiched between the second adhesive layer and the second polymeric layer. The first reinforcing layer and the second reinforcing layer may be the same or different material. In an embodiment, any number of layers may be envisioned.

In an embodiment, the articles may be formed through a method wherein the adhesive layer is applied to the fluoropolymer layer and subsequently applied to the polymeric layer. For instance, the adhesive layer may be extruded, melted, or laminated directly onto the fluoropolymer layer. In another embodiment, the articles may be formed through a method wherein the adhesive layer is applied to the polymeric layer and subsequently applied to the fluoropolymer layer. In an embodiment, the article may be formed through a method wherein the adhesive layer is extruded between the polymeric layer and the fluoropolymer layer.

In an embodiment, the article may be produced by belt lamination. In an example, the adhesive layer may be direct-extruded to apply the adhesive layer to the fluoropolymer layer. In an exemplary embodiment, the adhesive layer can be heated at a temperature sufficient to melt the adhesive layer. In another embodiment, the adhesive layer may be laminated to apply the adhesive layer to the fluoropolymer layer. The adhesive layer and the fluoropolymer layer may be belt laminated to the polymeric layer. In an embodiment, the fluoropolymer layer may be in contact with a first heated belt and the polymer layer may be in contact with a second belt, the second belt having a lower temperature than the first heated belt to maintain the integrity of the polymeric layer.

In an embodiment, the article may be produced by a one-step lamination process or a multi-step lamination process. In an embodiment, a fluoropolymer layer may be sandwiched between two adhesive layers and belt laminated. A polymer layer may be laminated on one or both adhesive layers. It is envisioned that any number of lamination steps may be possible to apply one or multiple layers to the article. Further, any temperature sufficient to adhere the layers is envisioned with the proviso that the temperature does not degrade the multilayer article.

In an embodiment, the adhesive layer may be applied to the fluoropolymer layer in a liquid state and dried or cured. In an embodiment, the adhesive layer may be in a liquid molten state and then cooled and solidified. Drying or curing may occur at a sufficient temperature to adhere the adhesive layer to the fluoropolymer layer. For instance, the adhesive layer may be a polymer material suspended in an aqueous solution. In another embodiment, the adhesive layer may be colloidal silica suspended in an aqueous solution. The adhesive layer and fluoropolymer layer may then be adhered to the polymeric layer. In another embodiment, the adhesive layer may be applied to the polymeric layer in a liquid state and dried or cured. The adhesive and polymeric layer may then be adhered to the fluoropolymer layer.

Once the article is formed, the article may be subjected to a seaming process. In an embodiment, two or more articles may be seamed. For instance, overlapping marginal end regions of two articles and applying a seaming process typically produces a seam. Any seaming process that provides a seam between polymeric materials is envisioned. A typical seaming process includes thermal treatment. In an embodiment, the thermal seaming process occurs at a temperature such that the multilayer article does not degrade. In an embodiment, the thermal seaming process typically occurs at a temperature not greater than about 300° F. In an embodiment, the seaming process occurs at a temperature not greater than about 250° F. In an embodiment, the thermal treatment is at a temperature from about 250° F. to about 350° F. In an embodiment, the thermal treatment is at a temperature not greater than about 350° F. In an embodiment, the thermal treatment is at a temperature greater than about 180° F. In an embodiment, the thermal treatment is at a temperature not greater than about 380° F., such as at a temperature of about 180° F. to about 380° F. Further exemplary seaming construction methods include lap seaming or butt seaming using hot air seaming, high frequency seaming, hot platen seaming, or adhesive tape seaming processes.

Once formed, particular embodiments of the above-disclosed article advantageously exhibit desired properties such as improved chemical barrier properties and flammability resistance. In an embodiment, the article may have a chemical permeation breakthrough time of greater than about thirty minutes, as measured in accordance with ASTM F739. In an embodiment, the article may have a chemical permeation breakthrough time of greater than about one hour, as measured in accordance with ASTM F739. In a further embodiment, the article meets the chemical permeation standards set by NFPA 1991 as measured in accordance with ASTM F 739. For example, the article meets the chemical permeation standards set by NFPA 1991 in Section 7.2.1 as measured in accordance with ASTM F 739 for chemicals such as acetone, acetonitrile, ammonia gas, 1,3-butadiene, carbon disulfide, chlorine gas, dichloromethane, diethylamine, dimethyl formamide, ethyl acetate, ethylene oxide, hexene, hydrogen chloride gas, methanol, methyl chloride gas, nitrobenzene, sodium hydroxide, sulfuric acid, tetrachloroethylene, tetrahydrofuran, and toluene. In an embodiment, the minimum detectable permeation rate for the permeation test apparatus shall be measured for each chemical tested. The minimum detectable permeation rate shall be less than or equal to 0.10 $\mu g/cm^2$/min for all permeation resistance tests. When using closed loop systems, the testing laboratory shall assume 1 hour accumulated permeation.

In an embodiment, the article has a flammability resistance of greater than about 1.5 seconds, such as greater than about 2.0 seconds, such as greater than about 2.5 seconds when tested in accordance with ASTM F1358. In an embodiment, the article has a flammability resistance of greater than about 3.0 seconds when tested in accordance with ASTM F1358. In a further embodiment, the article meets the flammability resistance standards set by NFPA 1991. For example, the article meets the flammability resistance standards set by NFPA 1991 in Section 7.2.2 as measured in accordance with ASTM F1358 wherein suit materials shall not ignite during the initial 3-second exposure period, shall not burn a distance of greater than 100 mm (4 in.), shall not sustain burning for more than 10 seconds, and shall not melt as evidenced by flowing or dripping during the subsequent 12-second exposure period.

In an exemplary embodiment, the article may exhibit desirable burst strength and tear resistance. For instance, the article may have a burst strength of at least about 200N, when tested in accordance with ASTM D751. In particular, the burst strength may be greater than about 300N, such as greater than about 500N, or even greater than about 600N. In an embodiment, the article may have a tear resistance of greater than about 50N, when tested in accordance with ASTM D2582. In particular, the tear resistance may be greater than about 60N, such as even greater than about 100N.

In an embodiment, the article may exhibit a desirable tensile strength. For instance, the article may have a tensile strength of at least about 1.5 kN/m, such as at least about 3.0 kN/m, when tested in accordance with ASTM D751. In an exemplary embodiment, the article has both a chemical permeation resistance of greater than about one hour, when measured by ASTM F739, and a burst strength of at least about 200N, when measured by ASTM D751. In an exemplary embodiment, the article has both a chemical permeation resistance of greater than about one hour, when measured in accordance with ASTM F739, and a tensile strength of at least about 3.0 kN/m, when measured in accordance with ASTM D751.

Articles made of the layers described above may have numerous applications. Applications include, for example, uses when the properties such as the above-mentioned burst strength, tensile strength, tear resistance, chemical permeation, and/or flammability resistance are desired. For instance, the article may be used when a chemical and/or biological resistant material is desired. In an embodiment, exemplary articles include shelters, liners, protective gear, clothing, and fluid containment systems.

EXAMPLE 1

An exemplary article is made. The fluoropolymer layer is a 1.4 (nominal) mil (0.0014") film obtained from Saint Gobain, product DB1700. The fluoropolymer layer is C-treated. The adhesive layer is a polyurethane melt adhesive film having 2 mil thickness (Bemis 3206). The polymeric layer is store-bought PVC having a clear, shiny finish.

This combination is combined in a press for 60 seconds at about 50 psi. To obtain lasting bond strength between the fluoropolymer and the adhesive in excess of the fluoropolymer film yield strength, the adhesive layer can be heated to a temperature of about 300° C. for FEP and about 350° F. for the PFA side. (The fluoropolymer film yield strength is about 2.0 lb/inch such that in peeling, the fluoropolymer is irreversibly stretched to a large degree or torn.) Good bonding to the PVC is observed from 250° F. The lamination occurs in one step since the PVC does not appear to melt under these conditions.

EXAMPLE 2

An article is made using the conditions from Example 1 with the following variations. "ST-3477 polyurethane" is the polymeric layer (obtained from Stevens Urethane), the Bemis 3206 adhesive is first bonded to the DB1700 as above, and then the polyurethane polymeric layer is laminated to the adhesive in a separate step at a lower temperature and pressure (25 psi). Heating at a temperature of 300° F. and some melting of the polyurethane results in a good bond.

EXAMPLE 3

Specimens of the following materials are made for full mechanical testing. The fluoropolymer layer is 1.4 mil of C-treated DB1700 (FEP side used). The adhesive layer is polyurethane Bemis 3206 at a thickness of 2.0 mils. For one article, the substrate layer is polyvinylchloride (PVC) from Plastic Film Corporation, weight 12, hardness "3H" having a matte finish. For the second article, the polymeric layer is polyvinylchloride (PVC) from Plastic Film Corporation, weight 12, hardness "2S" having a matte finish. The two articles are made on a belt laminator used in OneGlove manufacturing in Merrimack. Conditions are at a temperature of 350° F.; speed: 3 ft/min (over three 1' long heated platens); nip pressure: "standard for process".

The two articles are tested for some of the key mechanical properties required by NFPA 1991—burst, tear propagation, cold bending moment—and passed easily. Results can be seen in Table 1.

TABLE 1

|  | Burst strength (N) ASTM D751 - ring clamp method | Tear resistance (N) ASTM D2582 | Cold bending moment (ft-lb) ASTM D747 at −25° C. |
|---|---|---|---|
| NPFA 1991 spec | 200 N minimum | 49 N minimum | 0.5 maximum |
| 2S laminate | 532 | n/a | n/a |
| 3H laminate | 677 | 111 | 0.045 |

The properties of fluoropolymers and selection of polymeric materials for the third layer enable the articles to pass the flammability requirement as set in NPFA 1991. Further, the properties of fluoropolymers enable the articles to pass the chemical permeation requirement as set in NFPA 1991.

EXAMPLE 4

Two exemplary articles are made. The fluoropolymer layer is PVDF with an 80/20 by weight ratio of PVDF/PVC as the adhesive layer. The polymeric layer is PVC with a subsequent layer of PVC fabric coated with polyester (Seaman 8028). The PVC used in the adhesive layer and as the polymeric layer is Geon® 552 for the first article and Geon® 576 for the second article. The film of PVDF is cast on a 2 mil thick Melinex S carrier (size 2×4 inches). Two coats of PVDF compounded latex are applied, dried 2 minutes at 250° F. and fused 30 seconds at 400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 300° F. (1 minutes, 40 psig). The first multilayer article results in a good bond. The second multilayer article has an excellent bond to the PVC coated fabric however, the PVC polymeric layer is cracked.

EXAMPLE 5

Multiple articles are prepared with different PVDF/PVC ratios and diluted polymeric layer. The fluoropolymer layer is PVDF, the adhesive layer is PVDF/PVC, and the polymeric layer is PVC from Geon® 576. The PVDF/PVC ratios are 80/20, 85/15, and 90/10. The film of PVDF is cast on a 2 mil thick Melinex S carrier (size 2×4 inches) by free dipping two layers, drying 2 minutes at 250° F. and fused 30 seconds at 390°-400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 350° F. (1 minutes, 40 psig) and placed between two 5-mil thick Kapton HN films. In all cases, the bond of the film exceeds its tensile strength.

EXAMPLE 6

A multilayer article from a fluoropolymer layer of PVDF, 80/20 by weight ratio PVDF/PVC adhesive layer, and PVC polymeric layer is produced on a pilot tower. The carrier used is 5 mil Kapton HN, 10 in. wide. The running conditions are: drying zone set point of 250° F.; fusing zone set point of 400° F.; web speed of 7 fpm; bars are size 28 (grooved). The article is then bonded to PVC coated with polyester (Seaman 8028). In this case, the bond of the film to the coated PVC fabric exceeds the film strength.

EXAMPLE 7

A multilayer article using a surface treatment on the fluoropolymer is obtained from Saint Gobain, product DF1100. The article shows good adhesion to materials such as polyurethane (Bemis 6329) and liquid silicone rubber.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An article comprising:
   a first layer consisting essentially of a fluoropolymer, the first layer having a first major surface and a second major surface, wherein the first major surface is C-treated by exposing the first major surface to a corona discharge in an organic atmosphere;
   a second layer overlying the first major surface of the first layer, the second layer comprising an adhesive layer; and
   a third layer overlying the second layer, the third layer comprising a polymeric material;
   wherein the article is thermally seamable at a temperature not greater than about 300° F.; and
   wherein the article has a burst performance greater than about 200 N as measured by ASTM D751 and a chemical permeation breakthrough detection time greater than about one hour as measured by ASTM F739.

2. The article of claim 1, wherein the polymeric material of the third layer is a thermoset material or a thermoplastic material.

3. The article of claim 1, wherein the adhesive layer includes a thermoplastic material having a melt temperature not greater than about 300° F.

4. The article of claim 1, wherein the adhesive layer includes a thermoplastic material having a melt temperature greater than about 500° F.

5. The article of claim 1, wherein the adhesive layer includes a polyurethane or a polyvinylidene fluoride-polyvinyl chloride (PVDF-PVC).

6. The article of claim 1, wherein the fluoropolymer is selected from the group consisting of a polytetrafluoroethylene (PTFE), fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), an ethylene tetrafluoroethylene copolymer (ETFE), an ethylene chlorotrifluoroethylene copolymer (ECTFE), polychlorotrifluoroethylene (PCTFE), polyvinylidene fluoride (PVDF), and a tetrafluoroethylene hexafluoropropylene vinylidene fluoride terpolymer (THV).

7. The article of claim 6, wherein the fluoropolymer is polytetrafluoroethylene, fluorinated ethylene propylene copolymer (FEP), or a copolymer of tetrafluoroethylene and perfluoropropyl vinyl ether (PFA).

8. The article of claim 1, wherein at least the first major surface of the fluoropolymer layer includes a C-treatable fluoropolymer.

9. The article of claim 1, wherein the fluoropolymer includes fluorinated ethylene propylene (FEP), a copolymer of tetrafluoroethylene and perfluoropropyl vinyl ether (PFA), or blends thereof.

10. The article of claim 1, wherein at least one surface of the fluoropolymer layer includes colloidal silica.

11. The article of claim 1, wherein the polymeric material includes polyvinyl chloride (PVC).

12. The article of claim 1, further comprising a second adhesive layer overlying the second major surface of the first layer.

13. The article of claim 12, further comprising a second polymeric layer overlying the second adhesive layer.

14. The article of claim 1, having a tear resistance of greater than about 50 N as measured by ASTM D2582.

15. The article of claim 1, having a chemical permeation breakthrough detection that meets NFPA 1991 standards as measured in accordance with ASTM F739.

16. The article of claim 1, having a tensile strength of greater than about 3.0 kN/m as measured in accordance with ASTM D751.

17. The article of claim 1, having a flammability resistance of greater than about 3 seconds when tested in accordance with ASTM F1358.

18. The article of claim 1, further comprising a reinforcing layer directly contacting at least one major surface of the adhesive layer and at least one major surface of the polymeric layer.

19. The article of claim 1, wherein the article is seamed by a thermal process at a temperature not greater than about 300° F. such that the article does not degrade.

20. An article comprising:
a first layer consisting essentially of a fluoropolymer, the first layer having a first major surface and a second major surface, wherein the first major surface is C-treated by exposing the major surface to a corona discharge in an organic atmosphere;
a second layer overlying the first major surface of the first layer, the second layer comprising a thermoplastic adhesive layer, the thermoplastic adhesive having a melt temperature not greater than about 300° F.; and
a third layer overlying the second layer, the third layer comprising a polymeric material;
wherein the article is thermally seamable at a temperature not greater than about 300° F.; and
wherein the article has a burst performance greater than about 200 N as measured by ASTM D751 and a chemical permeation breakthrough detection time greater than about one hour as measured by ASTM F739.

21. The article of claim 20, wherein the thermoplastic adhesive is a polyurethane.

22. The article of claim 20, wherein the multilayer article is seamed by a thermal process at a temperature not greater than about 300° F. such that the multilayer article does not degrade.

23. A method of forming a multi-layer article comprising:
providing a first layer consisting essentially of a fluoropolymer, the first layer having a first major surface and a second major surface, wherein the first major surface is C-treated by exposing the first major surface to a corona discharge in an organic atmosphere;
providing a second layer overlying the first major surface of the first layer, the second layer comprising an adhesive layer;
providing a third layer overlying the second layer, the third layer comprising a polymeric layer; and
heating the multi-layer article to a temperature not greater than about 350° F.;
wherein the article is thermally seamable at a temperature not greater than about 300° F.; and
wherein the article has a burst performance greater than about 200 N as measured by ASTM D751 and a chemical permeation breakthrough detection time greater than about one hour as measured by ASTM F739.

24. The method of claim 23, wherein at least one surface of the fluoropolymer layer includes a C-treatable fluoropolymer.

25. The method of claim 24, wherein at least one surface of the fluoropolymer layer further includes colloidal silica.

26. The method of claim 23, further including the step of seaming the article via thermal treatment at a temperature not greater than about 300° F.

* * * * *